June 20, 1961 L. DEBBAGE 2,989,276
CONSTANT LOAD SUPPORTS
Filed Oct. 14, 1958
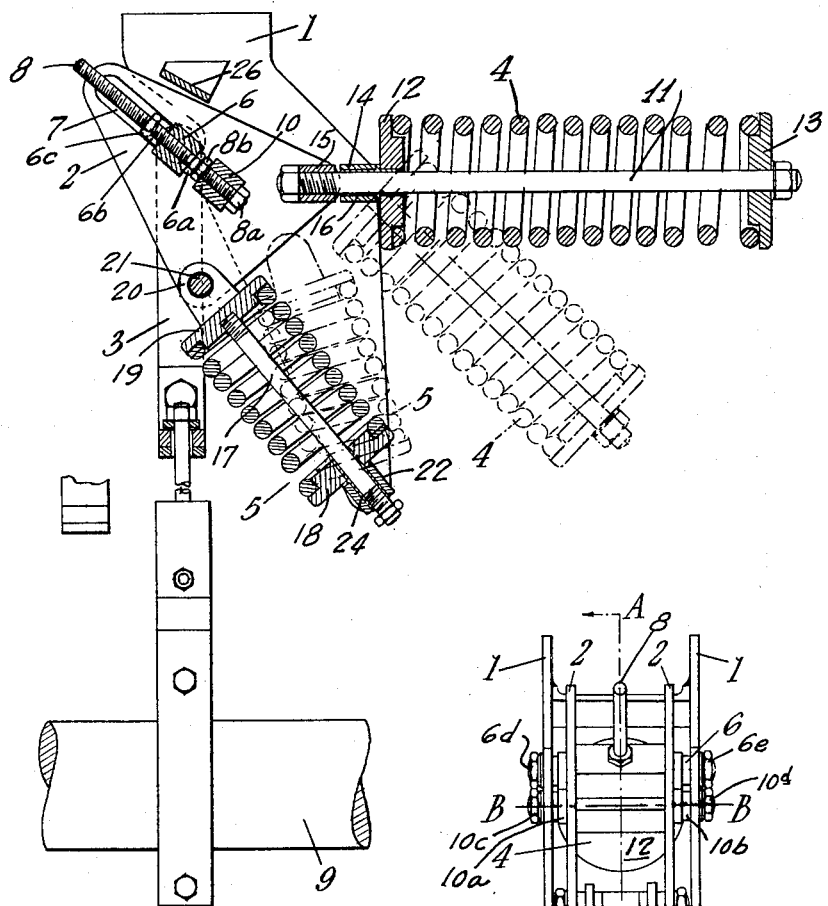
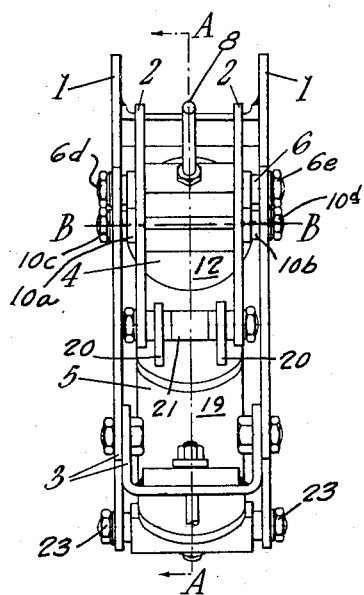
Fig. 2.
Fig. 1.

United States Patent Office 2,989,276
Patented June 20, 1961

2,989,276
CONSTANT LOAD SUPPORTS
Lawrence Debbage, Newcastle-upon-Tyne, England, assignor to C. A. Parsons & Company Limited, Newcastle-upon-Tyne, England
Filed Oct. 14, 1958, Ser. No. 767,217
Claims priority, application Great Britain Oct. 17, 1957
1 Claim. (Cl. 248—54)

This invention relates to apparatus which gives a constant or substantially constant support to pipes and the like connected to it and which allows for a certain amount of movement of the said pipes and the like in a vertical direction which apparatus we referred to below for convenience as a "spring support."

Various proposals have been made for constant load supports, but these have either been for use with constant load or if the load could be varied then the permissible travel of the load was limited.

The object of the present invention is to provide a constant load support of the kind defined above which allows more movement of the load than hitherto and allows for variation of the load.

In the drawing:
FIGURE 1 shows an end view of a support; and
FIGURE 2 a side view as a section on line AA of FIGURE 1, full lines showing the position of springs with load in upper position and dash lines that of lowest position, the small view at the left of FIGURE 2 indicating the load bracket in its lowest form.

In carrying the invention into effect in the form illustrated by way of example and with the parts in the position shown and referring first to FIGURE 1, the spring support comprises two fixed plates 1 to which are attached two triangular turnplates 2 which rotate about a fixed axis BB.

Bolted to the turnplates is a bracket 3 which carries the load, a primary spring 4 and a secondary spring 5.

The load bracket 3 is bolted to the turnplate by member 6 which lies in a slot 7 shown in FIGURE 2 in the turnplate. The turning moment of the load about the axis of rotation of the turnplate can be adjusted by moving the member 6 along the slot 7. The member 6 is locked in any given position in the slot by means of bolt 8. The load 9, movable vertically in the drawing, is attached to the load bracket 3, as indicated.

In the detailed structure shown in the drawing, the turnplates 2 are mounted on a crossmember 10 of square cross section except for its ends which are of circular cross-section. The circular ends fit loosely into bushes 10a, 10b which in turn fit into holes in the plates 1. The bushes 10a, 10b and the crossmember 10 are held in position by nuts 10c, 10d fitting on screwed end portions of the member 10.

Bolt 8 which may have an integral head 8a or separate head in the form of a nut screwed thereon, passes with clearance through the crossmember 10 and is held in position relative to the member 10 by a nut 8b. The bolt 8 also passes with clearance through the crossmember 6 supporting the load bracket 3. Circular ends of the member 6 are free to slide in slots 7 so that the load arm can be varied. The load arm is fixed in a desired position in the slots 7 by nuts 6a, 6b and check nut 6c.

Member 6 is attached to the load bracket 3 by means of nuts 6d, 6e.

The primary spring 4 has a central bolt 11 which passes through end plates 12 and 13 at each end of the spring. The end of bolt 11 passing through end plate 12 passes through crossmember 14 which has circular portions passing through holes in the plates 1 and connected thereto by nuts screwing onto threaded ends of the said circular portion so that as the turn plate rotates the member 14 can rotate relative to the plates 1.

The end of the bolt 11 is located in a hole in a cross member 15 passing between the turn plates and the arrangement is such that as the turn plate moves the bolt 11 pivots about the axis of the member 14 and slides in a bush 16 to compress the spring 4.

The secondary spring also has a central bolt 17 which passes through an end plate 18 at one end of the spring and is fixed to an end plate 19 at the other end of the spring. The end plate 19 has two projections 20 each of which has a hole therein through which passes a crossmember 21 which is in turn fixed to the turnplates 2. The end of the bolt 17 passing through end plate 18 also passes through a crossmember 22 which is fixed to plates 1 by means of nuts 23. The bolt is free to slide in both end plate 18 and crossmember 22 by the provision of a bush 24. As the turnplates rotate the end plate 19 compresses the spring.

In operation the primary spring 4 is set in the position shown in FIGURE 2 and as the direction of the force exerted by the spring passes through the axis of rotation BB of the turnplate 2 it exerts no supporting torque initially.

As the load 9 moves down the spring compresses and moves downwards in an arc until when fully loaded it gives a full supporting torque (turning moment) of say T units of torque.

The secondary spring 5 is initially set and placed so that it is in compression and gives a positive supporting torque of T/2 units of torque.

As the load moves down the lever arm for the secondary spring 5 decreases to zero then increases to its original value but giving a negative supporting torque of approximately T/2 units of torque.

As both springs act on the turnplate the net effect is that the resulting supporting torque over the range of movement of the load is approximately T/2.

This can be seen by considering three positions of the load as follows:

| Position of Load | Primary Spring | Secondary Spring | Resulting Torque |
| --- | --- | --- | --- |
| Top position | 0 | $T/2(+)$ | $T/2(+)$ |
| Mid position | $T/2(+)$ | 0 | $T/2(+)$ |
| Lowest position | $T(+)$ | $T/2(-)$ | $T/2(+)$ |

Thus there is approximately constant supporting torque (turning moment) throughout the movement of the load.

The abovementioned supporting torque can be achieved for any given load by adjusting the lever arm of the load bracket 3 as described above and by adjusting if necessary the resistance of the springs.

The support may be set in either the high or the low position depending on which way the load will move.

A turnplate stop 26 is provided on plates 1 to limit the rotation of the turnplate.

The support has the advantage that it is reasonably compact, it allows for movement of the load and also can be adjusted to meet variation of the load.

I claim:
A spring support comprising two fixed plates spaced from one another, two rigidly coupled turnplates attached to the fixed plates and rotatable about a common fixed axis, a load supporting bracket pivotally attached to the turnplates at an adjustably fixed distance from said common axis, two springs, a primary spring and a secondary spring pivotally attached to said fixed plates and pivotally attached to said turnplates at one end so as to be rotatable by said turnplate about said pivots, means responsive to movement of the turnplate for compressing said springs, said primary spring being initially set, when the load is at the limit of its travel in one direction, with its direction of force passing through the fixed axis of the turnplates hence exerting no turning moment on the turnplates and, with movement of the load towards its limit of travel in the other direction, the primary spring rotates about its pivot to exert a gradually increasing load supporting turning moment on the turnplates, reaching a maximum when the load is at the limit of its travel in the said other direction, the secondary spring being initially set to exert a load with its direction of force passing to one side of the fixed axis of the turnplates supporting turning moment equal to the moment of the load, then as the load moves the spring rotates about its pivot exerting a load supporting turning moment decreasing to zero when its direction of force passes through the fixed axis of the turnplates and thence to a negative load supporting turning moment reaching a maximum negative value when its direction of force passes on the other side of said fixed axis of the turnplates and when the primary spring exerts its maximum load supporting turning moment and its direction of force passes on the same side of said fixed axis of the turnplates as the direction of force of said secondary spring.

References Cited in the file of this patent

UNITED STATES PATENTS 2,535,305     Loepsinger  ------------ Dec. 26, 1950